US010559190B2

(12) United States Patent
Micheloni

(10) Patent No.: US 10,559,190 B2
(45) Date of Patent: Feb. 11, 2020

(54) ASSISTANCE SUMMONS DEVICE FOR MOTORCYCLE OR THE LIKE

(71) Applicant: Adrien Micheloni, Burbank, CA (US)

(72) Inventor: Adrien Micheloni, Burbank, CA (US)

(*) Notice: Subject to any disclaimer, the term of this patent is extended or adjusted under 35 U.S.C. 154(b) by 0 days.

(21) Appl. No.: 16/467,860

(22) PCT Filed: Dec. 13, 2017

(86) PCT No.: PCT/US2017/066087
§ 371 (c)(1),
(2) Date: Jun. 7, 2019

(87) PCT Pub. No.: WO2018/112029
PCT Pub. Date: Jun. 21, 2018

(65) Prior Publication Data
US 2019/0311603 A1 Oct. 10, 2019

Related U.S. Application Data

(63) Continuation of application No. 15/840,287, filed on Dec. 13, 2017, now Pat. No. 10,176,702.
(Continued)

(51) Int. Cl.
G08B 25/01 (2006.01)
G08B 25/10 (2006.01)
(Continued)

(52) U.S. Cl.
CPC ............ G08B 25/016 (2013.01); B62J 99/00 (2013.01); G01S 19/42 (2013.01); G08B 25/10 (2013.01);
(Continued)

(58) Field of Classification Search
CPC ........ G08B 25/016; G08B 25/10; B62J 99/00; G08G 1/205
(Continued)

(56) References Cited

U.S. PATENT DOCUMENTS 5,334,974 A * 8/1994 Simms .................. B60R 25/102
340/426.18
5,515,419 A * 5/1996 Sheffer ................. B60R 25/102
455/456.5
(Continued)

OTHER PUBLICATIONS

International Search Report in related International Application No. PCT/US17/66087; dated Apr. 27, 2018, 2 pages.
(Continued)

Primary Examiner — Eric Blount
(74) Attorney, Agent, or Firm — Craige Thompson; Thompson Patent Law

(57) ABSTRACT

A distress situation recognizing and remote assistance summoning device for recognizing a distress situation which may be encountered by a transport vehicle, and for summoning assistance via a wireless communications link is shown and described. The device may be self-contained in one unit and clamped to a tube member of the vehicle. The device includes microprocessor, a battery, a power cable connectable to a vehicle electrical system, accelerometer and gyroscope for sensing impacts, GPS capability, wireless communications capability for summoning assistance, an annunciator for annunciating transmission of an assistance request, a manual assistance request feature, a request cancellation feature, a delay feature delaying the assistance request, a visible and an audible beacon annunciating location of the vehicle, and a coverage annunciator signaling that the vehicle is in an area not in potential communication with a recipient of the request for assistance.

20 Claims, 4 Drawing Sheets

Related U.S. Application Data

(60) Provisional application No. 62/433,765, filed on Dec. 13, 2016.

(51) Int. Cl.
*G01S 19/42* (2010.01)
*B62J 99/00* (2009.01)
*G08G 1/0967* (2006.01)
*G08G 1/00* (2006.01)

(52) U.S. Cl.
CPC ....... *G08G 1/096766* (2013.01); *G08G 1/205* (2013.01); *B62J 2099/0013* (2013.01)

(58) Field of Classification Search
USPC ...................................................... 340/425.5
See application file for complete search history.

(56) References Cited

U.S. PATENT DOCUMENTS

| | | | | |
|---|---|---|---|---|
| 5,523,762 | A * | 6/1996 | Streetman | G08B 25/016 340/989 |
| 7,940,166 | B2 * | 5/2011 | Koliopoulos | B60Q 1/52 340/425.5 |
| 9,157,742 | B1 * | 10/2015 | Fahrner | G01C 21/00 |
| 9,852,599 | B1 * | 12/2017 | Slavin | H04W 4/90 |
| 2005/0128062 | A1 | 6/2005 | Lundsgaard et al. | |
| 2005/0151642 | A1 * | 7/2005 | Tupler | G08B 25/08 340/539.18 |
| 2006/0226960 | A1 | 10/2006 | Pisz et al. | |
| 2012/0218102 | A1 * | 8/2012 | Bivens | G08B 25/003 340/539.13 |
| 2013/0065628 | A1 | 3/2013 | Pfeffer | |
| 2013/0151699 | A1 | 6/2013 | Vock et al. | |
| 2014/0306826 | A1 * | 10/2014 | Ricci | H04W 4/21 340/573.1 |
| 2015/0102919 | A1 * | 4/2015 | Hsu | B62J 6/001 340/432 |
| 2016/0144915 | A1 | 5/2016 | Bejestan et al. | |

OTHER PUBLICATIONS

Written Opinion of the International Searching Authority in related International Application No. PCT/US17/66087; dated Apr. 27, 2017, 4 pages.

* cited by examiner

US 10,559,190 B2

ASSISTANCE SUMMONS DEVICE FOR MOTORCYCLE OR THE LIKE

CROSS-REFERENCE TO RELATED APPLICATIONS

This application claims the benefit of priority to U.S. Non-Provisional Utility patent application Ser. No. 15/840,287, filed on Dec. 13, 2017 and U.S. Provisional Utility Application Ser. No. 62/433,765, filed on Dec. 13, 2016, the contents of both are incorporated by this reference.

TECHNICAL FIELD

The present invention relates to devices for sensing a distress situation and summoning assistance.

BACKGROUND ART

Riders of motorcycles and bicycles may encounter collisions, falls, and other distress situations, and may be in need of assistance. Devices which automatically recognize a distress situation and summon assistance remotely have been proposed. In many cases, these devices are somewhat complicated and may require plural components, may be incorporated into helmets or apparel, or into the wheeled vehicle being used.

It is desirable that an assistance summoning device have manual features in addition to automatic features.

There remains a need in the art for a practical, versatile device for recognizing a distress situation and summoning assistance remotely.

DISCLOSURE OF THE INVENTION

The present invention comprises a compact, self-contained distress situation recognizing and remote assistance summoning device for motorcycles, motorbikes, bicycles and other personal transportation vehicles having exposed tubular members. The device includes a clamp for encircling a tubular member of a vehicle or accessory, such as a ski pole. The device includes sensors for recognizing a distress situation, which may include any or all of an accelerometer, gyroscope, and a GPS sensor. The device includes wireless communications capability for sending distress signals responsive to sensing a distress situation. The device may include manual input devices such as a indicator of the number of riders and manual distress signaling. A request for assistance may be sent manually. The device may include a manual cancellation feature canceling a request for assistance. The device may include a visual beacon, an audible beacon, or both, to assist emergency responders in locating the device and its associated vehicle.

The present invention provides improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

MODES FOR CARRYING OUT THE INVENTION

Figure 1:
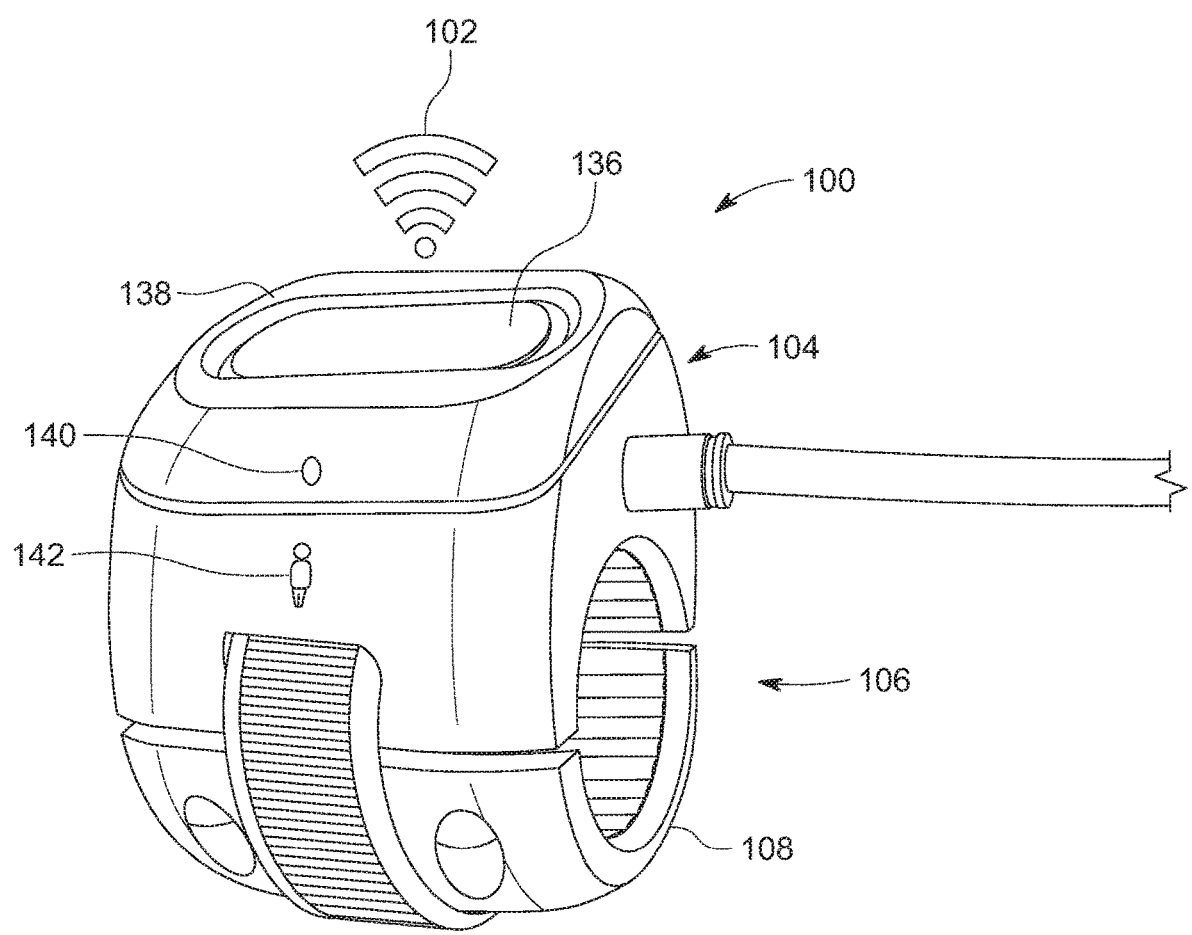
FIG. 1 is a perspective view of a distress situation recognizing and remote assistance summoning device, according to at least one aspect of the disclosure.
Figure 2:
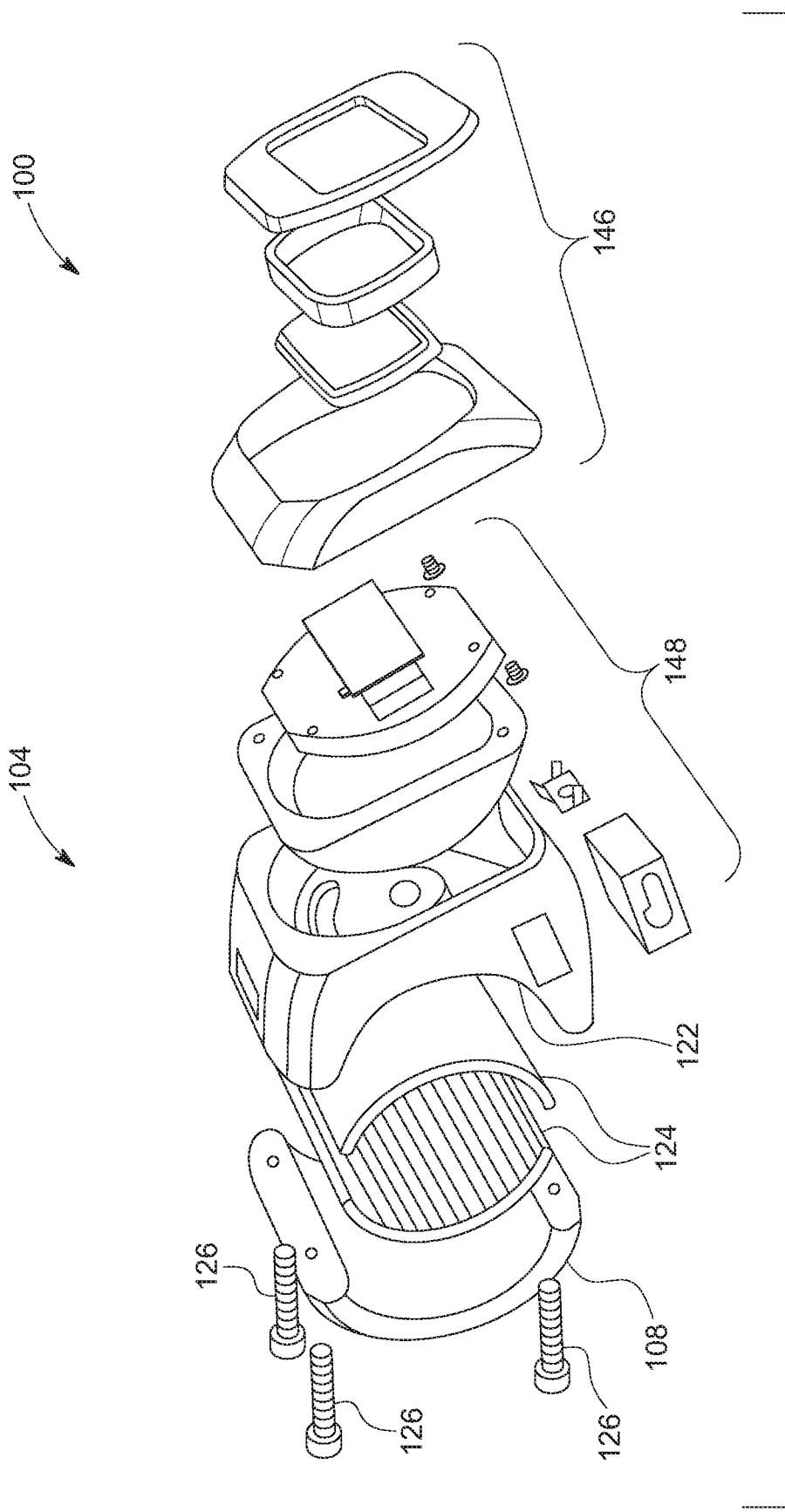
FIG. 2 is an exploded perspective view of the distress situation recognizing and remote assistance summoning device of FIG. 1, according to at least another aspect of the disclosure.

Referring to FIGS. 1-4, according to at least one aspect of the invention, there is shown a distress situation recognizing and remote assistance summoning device 100 for recognizing a distress situation which may be encountered by a transport vehicle (not shown) having at least one rider (not shown) and a tubular member 10, and for summoning assistance via a wireless communications link 102. Distress situation recognizing and remote assistance summoning device 100 may comprise a housing 104 including a clamp 106 for encircling tubular member 10 of the transport vehicle. Clamp 106 may include a detachable saddle 108. Within housing 104, distress situation recognizing and remote assistance summoning device 100 may include a microprocessor 110 configured to manage functional features of distress situation recognizing and remote assistance summoning device 100. Within housing 104, distress situation recognizing and remote assistance summoning device 100 may include a power source and a power circuit 112 connecting the power source to microprocessor 110. Within housing 104, at least a first sensor may be configured to sense a first distress parameter and a second sensor may be configured to sense a second distress parameter. The first sensor and the second sensor are communicatively connected to microprocessor 110.

Coupled to housing 104, a GPS tracking system 114 includes a GPS receiver 116 communicably connected to microprocessor 110. Within housing 104, distress situation recognizing and remote assistance summoning device 100 may include a wireless signal transmitter 118 configured to transmit a request for assistance to a remote source of assistance (not shown), communicably connected to microprocessor 110, and at least one transmission annunciator 120 configured to annunciate transmission of a signal summoning assistance via wireless communications link 102 responsive to at least one of the at least one sensor and the at least second sensor, transmission annunciator 120 communicably connected to microprocessor 110.

Unless otherwise indicated, the terms "first", "second", etc., are used herein merely as labels, and are not intended to impose ordinal, positional, or hierarchical requirements on the items to which these terms refer. Moreover, reference to, e.g., a "second" item does not either require or preclude the existence of, e.g., a "first" or lower-numbered item, and/or, e.g., a "third" or higher-numbered item.

Clamp 106 comprises detachable saddle 108 and that surface 122 (FIG. 2) of housing 104 facing detachable saddle 108. Surface 122 and detachable saddle 108 may be covered by sections 124 of a resilient, treaded pad for gripping tubular member 10. Detachable saddle 108 may be secured to housing 104 by threaded fasteners such as bolts or screws 126, by threaded studs with nuts (this option is not shown), or by a ratchet tie 128 (FIGS. 1 and 3), or by any combination of these.

Power circuit 112 may also serve as a control circuit for some items, such as indicating lamps (e.g., transmission annunciator 120). Power circuit 112 is shown schematically, and will be understood to include all conductors and other components necessary for operation as described herein.

Figure 4:
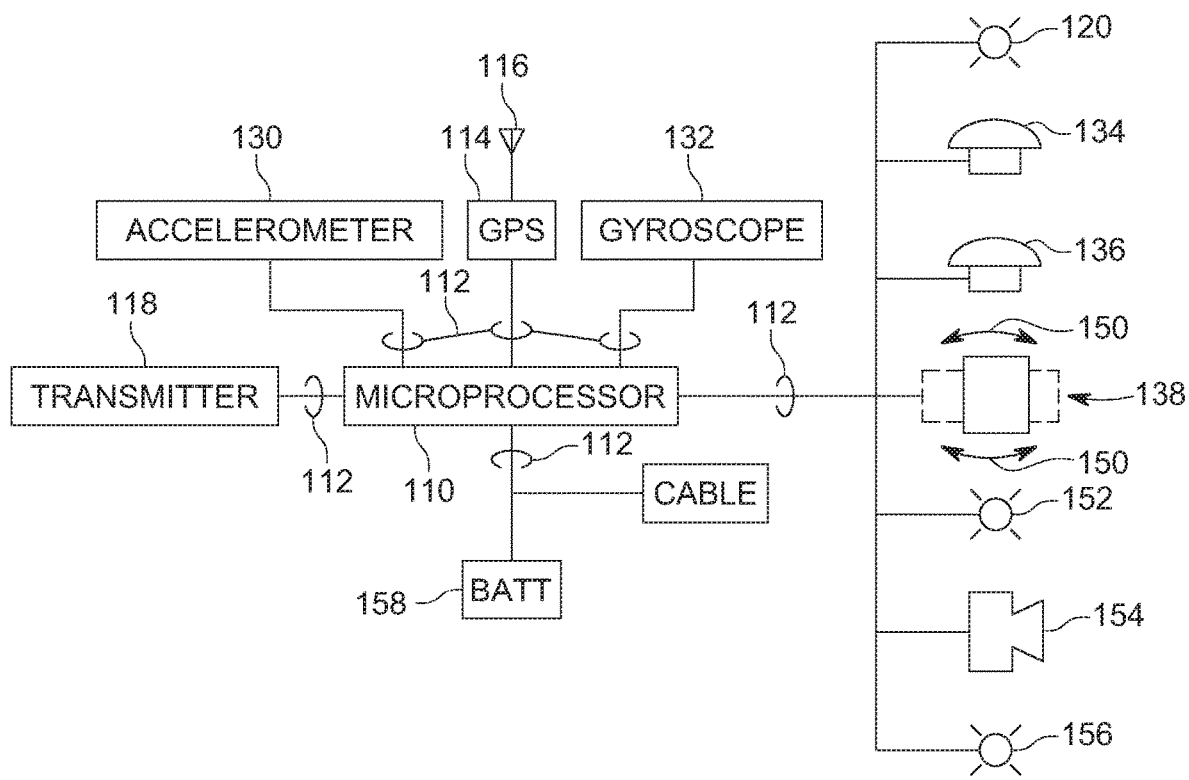
FIG. 4 is a schematic view of components in or on the distress situation recognizing and remote assistance summoning device of FIG. 1, according to a further aspect of the disclosure.

The first sensor may comprise may be configured to sense a first distress parameter and a second sensor may be configured to sense a second distress parameter. An example of a distress parameter is an impact, as sensed by accelerometer 130, or excessive leaning or excessively rapid change of direction, as sensed by a gyroscope 132 (FIG. 4).

A remote source of assistance may be for example a facility reachable by using a telephone system to dial 911, or alternatively, a private party tasked with responding to requests for assistance.

Transmission annunciator 120 provides local confirmation of transmission of the signal summoning assistance.

Distress situation recognizing and remote assistance summoning device 100 may further comprise a first manual control 134 configured to cancel the request for assistance, first manual control 134 communicably connected to microprocessor 110. First manual control 134 may take the form of a pushbutton accessible from the exterior of housing 104.

Distress situation recognizing and remote assistance summoning device 100 may further comprise a second manual control 136 for manually generating a request for assistance via the wireless communications link 102, manual control 136 communicably connected to microprocessor 110. Second manual control 136 may be a pushbutton accessible from the exterior of housing 104.

Figure 3:
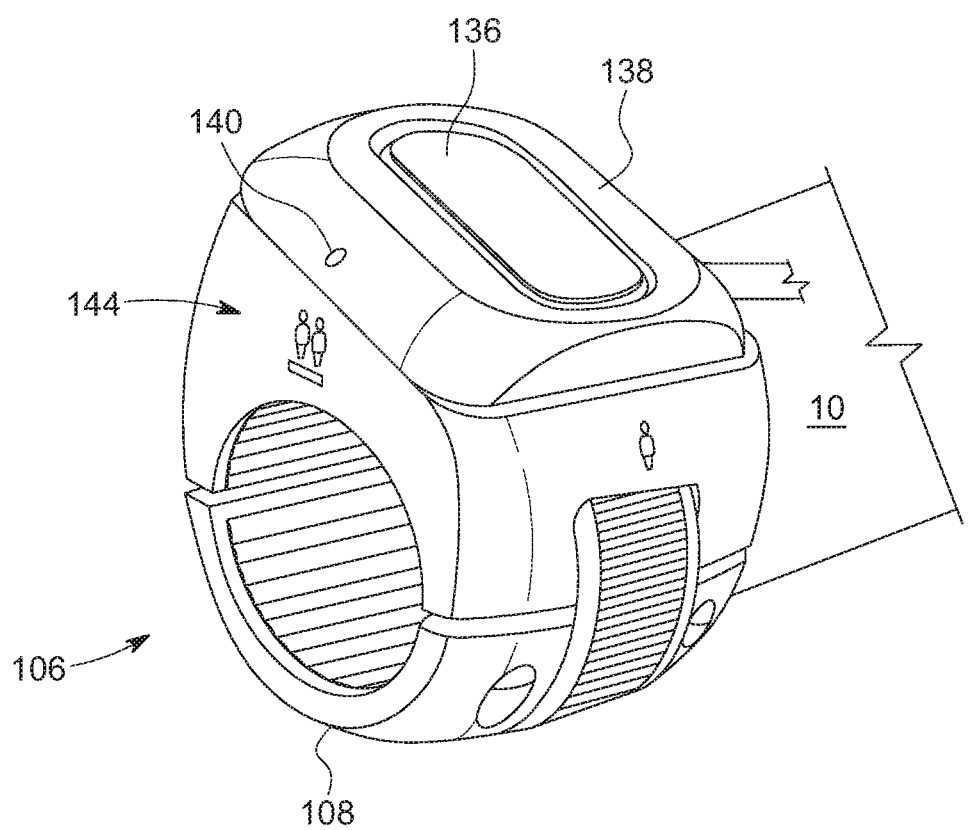
FIG. 3 is an environmental perspective view of the distress situation recognizing and remote assistance summoning device of FIG. 1, with a control element rotated from the position shown in FIG. 1, according to an aspect of the disclosure.

Distress situation recognizing and remote assistance summoning device 100 may further comprise a third manual control 138 configured to cancel the request for assistance, and may be communicably connected to microprocessor 110. As seen in FIG. 4, third manual control 138 may comprise a rotatable switch. As seen in FIGS. 1 and 3, second manual control 136 may be carried on third manual control 138. As seen in FIGS. 1 and 3 respectively, the rotatable switch may have an indicator 140 which may be aligned with an occupant icon 142 (indicating one rider) or with an occupant icon 144 (indicating two riders). Switch operator components 146 are shown separated in FIG. 2. Internal components 148 such as electronic circuitry, microprocessor 110, GPS tracking system 114, accelerometer 130, and gyroscope 132, are shown slightly separated in FIG. 2.

Distress situation recognizing and remote assistance summoning device 100 may further comprise a delay feature delaying the request for assistance for a predetermined time period after the at least one sensor senses the first distress parameter or the second distress parameter or both. The delay feature is realized via programming of microprocessor 110, in conjunction with an internal timer (not separately shown).

In distress situation recognizing and remote assistance summoning device 100, wireless signal transmitter 118 may be configured to render the request for assistance as a text message. Of course, microprocessor 110 may be programmed to transmit text data.

In distress situation recognizing and remote assistance summoning device 100, a location is determined by GPS tracking system 114 and is included in the request for assistance.

Distress situation recognizing and remote assistance summoning device 100 may further comprise a manual switch providing an input to microprocessor 110 indicative of the number of riders using distress situation recognizing and remote assistance summoning device 100, the manual switch communicatively connected to microprocessor 110. This manual switch may be integrated with manual control 138, and may be operated by rotating a switch operator portion of manual control 138. This is indicated as arrows 150 in FIG. 4, and is seen in the alternative positions of third manual control 138 in FIGS. 1 and 3.

Distress situation recognizing and remote assistance summoning device 100 may further comprise at least one of a local visible beacon 152 and a local audible beacon 154 annunciating location of the vehicle after the request for assistance has been transmitted. Local visible beacon 152 may comprise an LED lamp visible from the exterior of housing 104. Local audible beacon may comprise a piezoelectric buzzer, one of internal components 148.

The various components described herein and associated functionalities may be provided in any feasible combination, and not only in those individually or explicitly described herein. Notably, the following combinations are explicitly contemplated.

In one example, the distress situation recognizing and remote assistance summoning device 100 for recognizing a distress situation, which may be encountered by a transport vehicle having at least one rider and a tubular member, and for summoning assistance via wireless communications link 102, may comprise housing 104; within housing 104, microprocessor 110 configured to manage functional features of distress situation recognizing and remote assistance summoning device 100; a power source and power circuit 112 connecting the power source to microprocessor 110; at least a first sensor configured to sense a first distress parameter and a second sensor configured to sense a second distress parameter and communicatively connected to microprocessor 110; coupled to housing 104, GPS tracking system 114 including GPS receiver 116 communicatively connected to microprocessor 110; within housing 104, wireless signal transmitter 118 configured to transmit a request for assistance to a remote source of assistance, communicatively connected to microprocessor 110 at least one first annunciator 120 configured to annunciate transmission of a signal summoning assistance via wireless communications link 102, responsive to at least one of the at least one sensor and the at least second sensor, communicatively connected to microprocessor 110; and first manual control 134 configured to cancel the request for assistance communicatively connected to microprocessor 110.

The aforementioned combination of components of distress situation recognizing and remote assistance summoning device 100 may further comprise second manual control 136 for manually generating a request for assistance via wireless communications link 102, communicably connected to microprocessor 110.

The aforementioned distress situation recognizing and remote assistance summoning device 100 may further comprise third manual control 138 configured to cancel the request for assistance, communicably connected to microprocessor 110, and the delay feature configured to delay the request for assistance for a predetermined time period after the at least one sensor senses the first distress parameter or the second distress parameter or both.

In the aforementioned distress situation recognizing and remote assistance summoning device 100, wireless signal transmitter 118 may be configured to render the request for assistance as a text message.

In the aforementioned distress situation recognizing and remote assistance summoning device 100, a location is determined by GPS tracking system 114 and is included in the request for assistance.

The aforementioned distress situation recognizing and remote assistance summoning device 100 may further comprise a manual switch (e.g., manual control 138, using the rotation feature) providing an input to microprocessor 110 indicative of the number of riders using distress situation recognizing and remote assistance summoning device 100, wherein the manual switch is communicatively connected to microprocessor 110.

The aforementioned distress situation recognizing and remote assistance summoning device 100 may further comprise at least one of local visible beacon 152 and local audible beacon 154 annunciating location of the vehicle after the request for assistance has been transmitted.

In the aforementioned distress situation recognizing and remote assistance summoning device 100, the first sensor may comprise accelerometer 130, and the second sensor may comprise gyroscope 132.

The aforementioned distress situation recognizing and remote assistance summoning device 100 may further comprise a coverage annunciator 156 configured to signal to a driver of the vehicle that the vehicle is in an area not in potential communication with a recipient of the request for assistance. This may be determined by using a look-up table loaded into a memory of microprocessor 110, may be determined by reading responses to signals from transmitter 118, or in some other way.

In the aforementioned distress situation recognizing and remote assistance summoning device 100, the power source may comprise a battery (or battery cell) 158 (FIG. 4).

The aforementioned distress situation recognizing and remote assistance summoning device 100 may further comprise a power cable 160 removably attachable to an electrical system of the transport vehicle and removably attachable to power circuit 112. Battery 158 and power cable 160 may both be provided, to keep the former fully charged. This may become desirable should a collision or other event arise which disrupts power cable 160, but still requires electrical components of distress situation recognizing and remote assistance summoning device 100 to operate.

Figure 5:
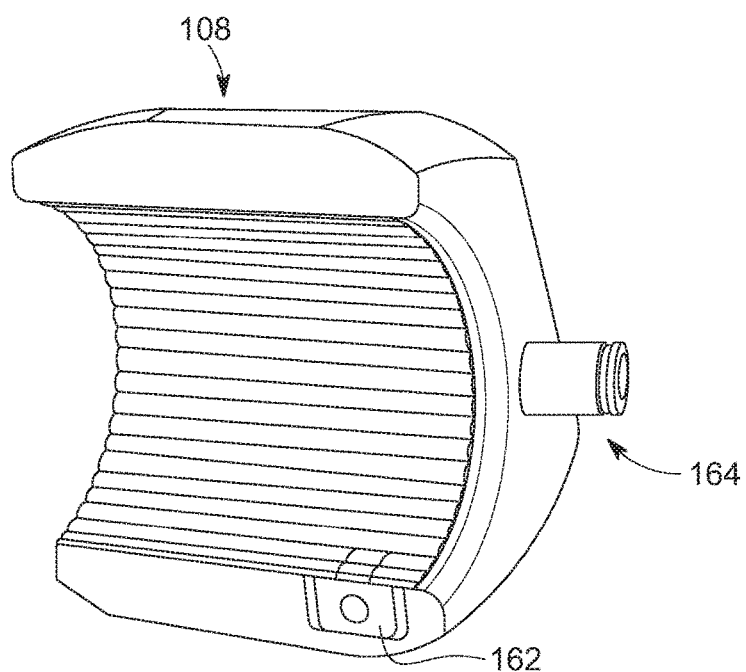
FIG. 5 is a perspective view of a component seen at the left of FIG. 2, and is rendered to increased scale, according to an aspect of the disclosure.

Referring to FIG. 5, a ground plane 162 and a ground connection port 164 may be provided as part of detachable saddle 108 to complete power circuit 112. Of course, either or both of ground plane 162 and ground connection port 164 may be located on housing 104 if desired.

It will be appreciated that although description of the invention has been presented with principal reference to motorcycles, those of skill in the art will recognize that there has been presented an accessory mounting suitable for monocycles, bicycles, tricycles, all terrain vehicles, sleds, carts, wagons, scooters, boats having tubular rails, gliders, aircraft, automobiles, trucks, wheeled garden vehicles, construction, mining, and farm vehicles and drawn equipment, and still other devices.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

INDUSTRIAL APPLICABILITY

The disclosed invention would be valuable to riders of motorcycles and bicycles as they may encounter collisions, falls, and other distress situations, and may be in need of assistance.

I claim:

1. A distress situation recognizing and remote assistance summoning device for recognizing a distress situation and for summoning assistance via a wireless communications link, the distress situation recognizing and remote assistance summoning device comprising:
    a housing;
    within the housing, a microprocessor programmably configured to control manual features of the distress situation recognizing and remote assistance summoning device;
    within the housing, a power source and a power circuit connecting the power source to the microprocessor;
    within the housing, at least a first sensor configured to sense a first distress parameter and a second sensor configured to sense a second distress parameter, the at least a first sensor and a second sensor communicatively connected to the microprocessor;
    coupled to the housing, a GPS tracking system including a GPS receiver communicatively connected to the microprocessor;
    within the housing, a wireless signal transmitter configured to transmit a request for assistance to a remote source of assistance, the wireless signal transmitter communicatively connected to the microprocessor; and
    at least one first annunciator configured to annunciate transmission of the request for assistance via the wireless communications link responsive to the first distress parameter or the second distress parameter sensed by the at least a first sensor and a second sensor.

2. The distress situation recognizing and remote assistance summoning device of claim 1, further comprising a first manual control configured to cancel the request for assistance, the first manual control communicatively connected to the microprocessor.

3. The distress situation recognizing and remote assistance summoning device of claim 1, further comprising a second manual control for manually generating a request for assistance viz the wireless communications link, the second manual control communicatively connected to the microprocessor.

4. The distress situation recognizing and remote assistance summoning device of claim 3, further comprising a third manual control configured to cancel the request for assistance, the third manual control communicatively connected to the microprocessor.

5. The distress situation recognizing and remote assistance summoning device of claim 4, wherein the microprocessor is configured to perform a delay function to delay the request for assistance for a predetermined time period after the at least a first sensor and a second sensor sense the first distress parameter or the second distress parameter or both.

6. The distress situation recognizing and remote assistance summoning device of claim 1, wherein the wireless signal transmitter is configured to render the request for assistance as a text message.

7. The distress situation recognizing and remote assistance summoning device of claim 1, wherein the GPS tracking system determines a location that is included in the request for assistance.

8. The distress situation recognizing and remote assistance summoning device of claim 1, further comprising a manual switch providing an input to the microprocessor indicative of the number of riders using the distress situation recognizing and remote assistance summoning device, the manual switch communicatively connected to the microprocessor.

9. The distress situation recognizing and remote assistance summoning device of claim 1, further comprising at least one of a local visible beacon and a local audible beacon annunciating location of a vehicle after the request for assistance has been transmitted.

10. A distress situation recognizing and remote assistance summoning device for recognizing a distress situation and for summoning assistance via a wireless communications link, the distress situation recognizing and remote assistance summoning device comprising:
   a microprocessor programmably configured to manage manual features of the distress situation recognizing and remote assistance summoning device;
   a power source and a power circuit connecting the power source to the microprocessor;
   at least one sensor configured to sense a first distress parameter or a second distress parameter, the at least one sensor communicatively connected to the microprocessor;
   a GPS tracking system including a GPS receiver communicatively connected to the microprocessor;
   a wireless signal transmitter configured to transmit a request for assistance to a remote source of assistance, the wireless signal transmitter communicatively connected to the microprocessor;
   at least one first annunciator configured to annunciate transmission of the request for assistance via the wireless communications link responsive to the first distress parameter or the second distress parameter sensed by the at least one sensor; and
   a first manual control configured to cancel the request for assistance, the first manual control communicatively connected to the microprocessor.

11. The distress situation recognizing and remote assistance summoning device of claim 10, further comprising a second manual control for manually generating a request for assistance via the wireless communications link, the second manual control communicatively connected to the microprocessor.

12. The distress situation recognizing and remote assistance summoning device of claim 10, further comprising
   a third manual control configured to cancel the request for assistance, the third manual control communicatively connected to the microprocessor; and
   a delay function configured by the microprocessor to delay the request for assistance for a predetermined time period after the at least one sensor senses the first distress parameter or the second distress parameter or both.

13. The distress situation recognizing and remote assistance summoning device of claim 10, wherein the wireless signal transmitter is configured to render the request for assistance as text data.

14. The distress situation recognizing and remote assistance summoning device of claim 10, wherein the GPS tracking system determines a location that is included in the request for assistance.

15. The distress situation recognizing and remote assistance summoning device of claim 10, further comprising a manual switch providing an input to the microprocessor indicative of the number of users using the distress situation recognizing and remote assistance summoning device, the manual switch communicatively connected to the microprocessor.

16. The distress situation recognizing and remote assistance summoning device of claim 10, further comprising at least one of a local visible beacon and a local audible beacon annunciating location of the distress situation recognizing and remote assistance summoning device after the request for assistance has been transmitted.

17. The distress situation recognizing and remote assistance summoning device of claim 10, wherein the at least one sensor is selected from a group of sensors consisting of an accelerometer and a gyroscope.

18. The distress situation recognizing and remote assistance summoning device of claim 10, further comprising a coverage annunciator configured to signal to a user that the distress situation recognizing and remote assistance summoning device is in an area not in potential communication with a recipient of the request for assistance.

19. The distress situation recognizing and remote assistance summoning device of claim 10, further comprising a housing, wherein the housing at least includes the microprocessor, the power source and the power circuit, the at least one sensor, and the wireless signal transmitter.

20. The distress situation recognizing and remote assistance summoning device of claim 10, further comprising a power cable removably attached to an electrical system of a transport vehicle and removably attached to the power circuit.

* * * * *